(12) United States Patent
Chen et al.

(10) Patent No.: US 11,985,427 B2
(45) Date of Patent: May 14, 2024

(54) DISPLAY DEVICE WITH RETRACTABLE AND ROTATABLE CAMERA MODULE

(71) Applicants: Inventec (Pudong) Technology Corp., Shanghai (CN); Inventec Corporation, Taipei (TW)

(72) Inventors: Chien-Chang Chen, Taipei (TW); Chin-Yi Lin, Taipei (TW); Chia-Chen Chen, Taipei (TW); Chi-Zen Peng, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 80 days.

(21) Appl. No.: 17/841,651

(22) Filed: Jun. 15, 2022

(65) Prior Publication Data
US 2023/0292009 A1    Sep. 14, 2023

(30) Foreign Application Priority Data

Mar. 14, 2022   (CN) .......................... 202210248120.8

(51) Int. Cl.
| H04N 23/695 | (2023.01) |
| G01B 21/22 | (2006.01) |
| H04N 23/51 | (2023.01) |
| H04N 23/54 | (2023.01) |
| H04N 23/57 | (2023.01) |

(52) U.S. Cl.
CPC ........... *H04N 23/695* (2023.01); *G01B 21/22* (2013.01); *H04N 23/51* (2023.01); *H04N 23/54* (2023.01); *H04N 23/57* (2023.01)

(58) Field of Classification Search
CPC ....... H04N 23/695; H04N 23/51; H04N 23/57
See application file for complete search history.

(56) References Cited

U.S. PATENT DOCUMENTS

| 2007/0253703 A1* | 11/2007 | Tsai | ...................... H04N 7/142 |
| | | | 348/E5.025 |
| 2019/0250667 A1* | 8/2019 | Fan | ..................... H04M 1/0237 |

* cited by examiner

*Primary Examiner* — Nicholas G Giles
(74) *Attorney, Agent, or Firm* — Winston Hsu

(57) ABSTRACT

A display device includes a display module and a camera module. The camera module includes a first housing, a second housing and a camera unit. The first housing is movably disposed on the display module. The second housing is separably connected to the first housing. The camera unit is disposed on the second housing. The second housing is able to move with the first housing in relative to the display module, such that the camera unit is exposed from the display module or hidden in the display module. When the second housing is separated from the first housing, the second housing is able to rotate in relative to the first housing, so as to adjust an orientation of the camera unit.

7 Claims, 9 Drawing Sheets

DISPLAY DEVICE WITH RETRACTABLE AND ROTATABLE CAMERA MODULE

BACKGROUND OF THE INVENTION

1. Field of the Invention

The invention relates to a display device and, more particularly, to a display device with a retractable and rotatable camera module.

2. Description of the Prior Art

At present, a notebook computer has been considered a necessity by a lot of people in daily life. In general, a camera of the notebook computer is disposed on a top side of a bezel of a display device, such that the size of the top side of the bezel cannot be reduced. Thus, the screen-to-body ratio (STBR) cannot increase. Furthermore, the camera always faces a front side of the display device, so a user cannot utilize the camera to capture images for a rear side of the display device while operating the notebook computer. Still further, the camera is sometimes hacked by intentional people to violate the privacy of the user. In order to add the privacy protection function of the camera, an additional privacy protection structure must be added, such that the manufacturing cost increases.

SUMMARY OF THE INVENTION

The invention provides a display device with a retractable and rotatable camera module, so as to solve the aforesaid problems.

According to an embodiment of the invention, a display device comprises a display module and a camera module. The camera module comprises a first housing, a second housing and a camera unit. The first housing is movably disposed on the display module. The second housing is separably connected to the first housing. The camera unit is disposed on the second housing. The second housing is able to move with the first housing in relative to the display module, such that the camera unit is exposed from the display module or hidden in the display module. When the second housing is separated from the first housing, the second housing is able to rotate in relative to the first housing, so as to adjust an orientation of the camera unit.

As mentioned in the above, the invention disposes the camera module on the display module in a movable manner to prevent the camera module from occupying a space on a top side of a bezel of the display device. Accordingly, the top side of the bezel of the display device can be reduced to increase the screen-to-body ratio (STBR). Furthermore, when a user does not need to use the camera module, the camera unit may be hidden in the display module to achieve the privacy protection function without adding an additional privacy protection structure. Moreover, the user may separate the second housing from the first housing and then rotate the second housing in relative to the first housing, so as to orientate the camera unit toward a rear side of the display device. Accordingly, the camera unit may be used to capture images for the front or rear side of the display device, so as to increase the flexibility of the camera module in use.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
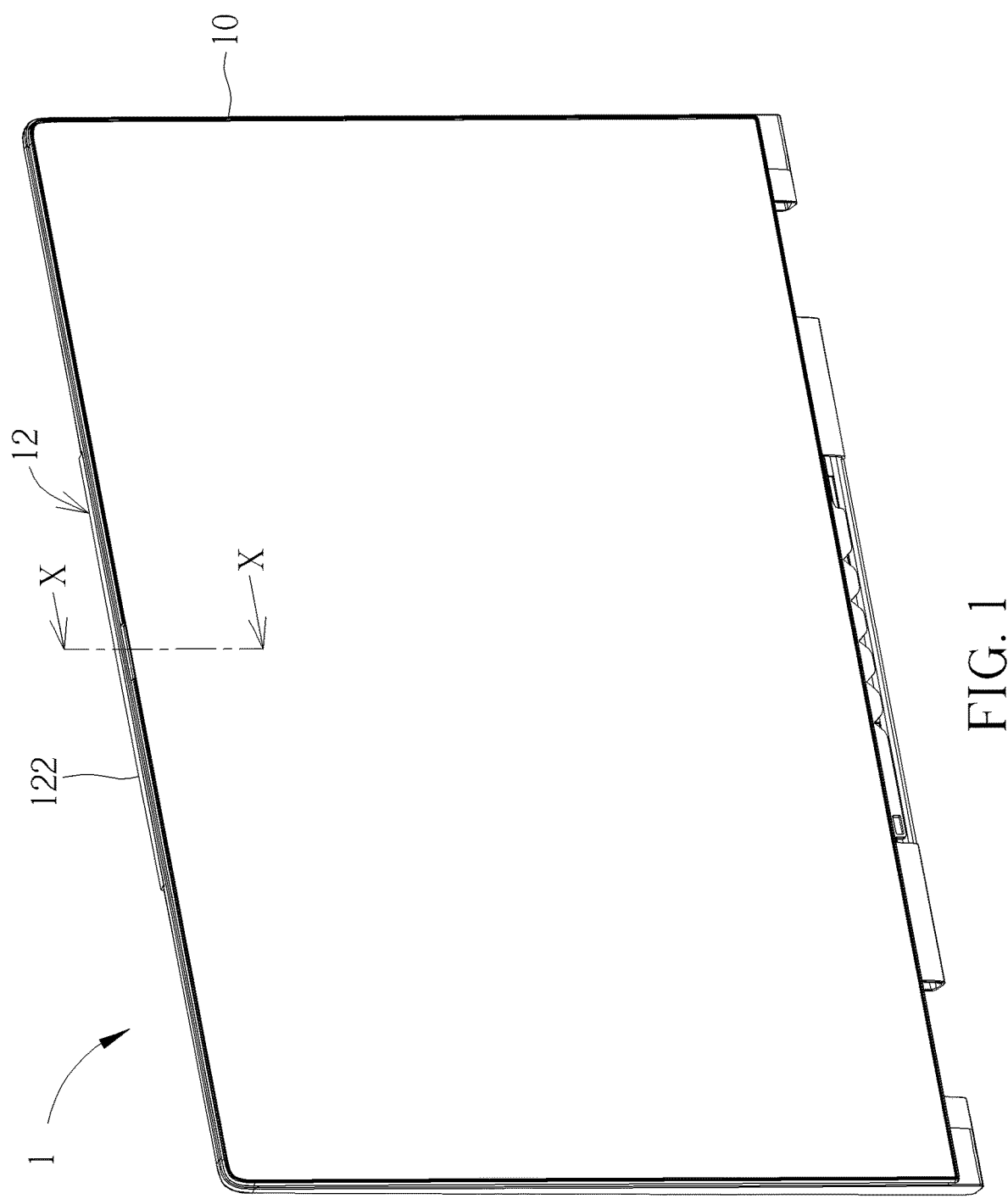
FIG. 1 is a perspective view illustrating a display device according to an embodiment of the invention.
Figure 2:
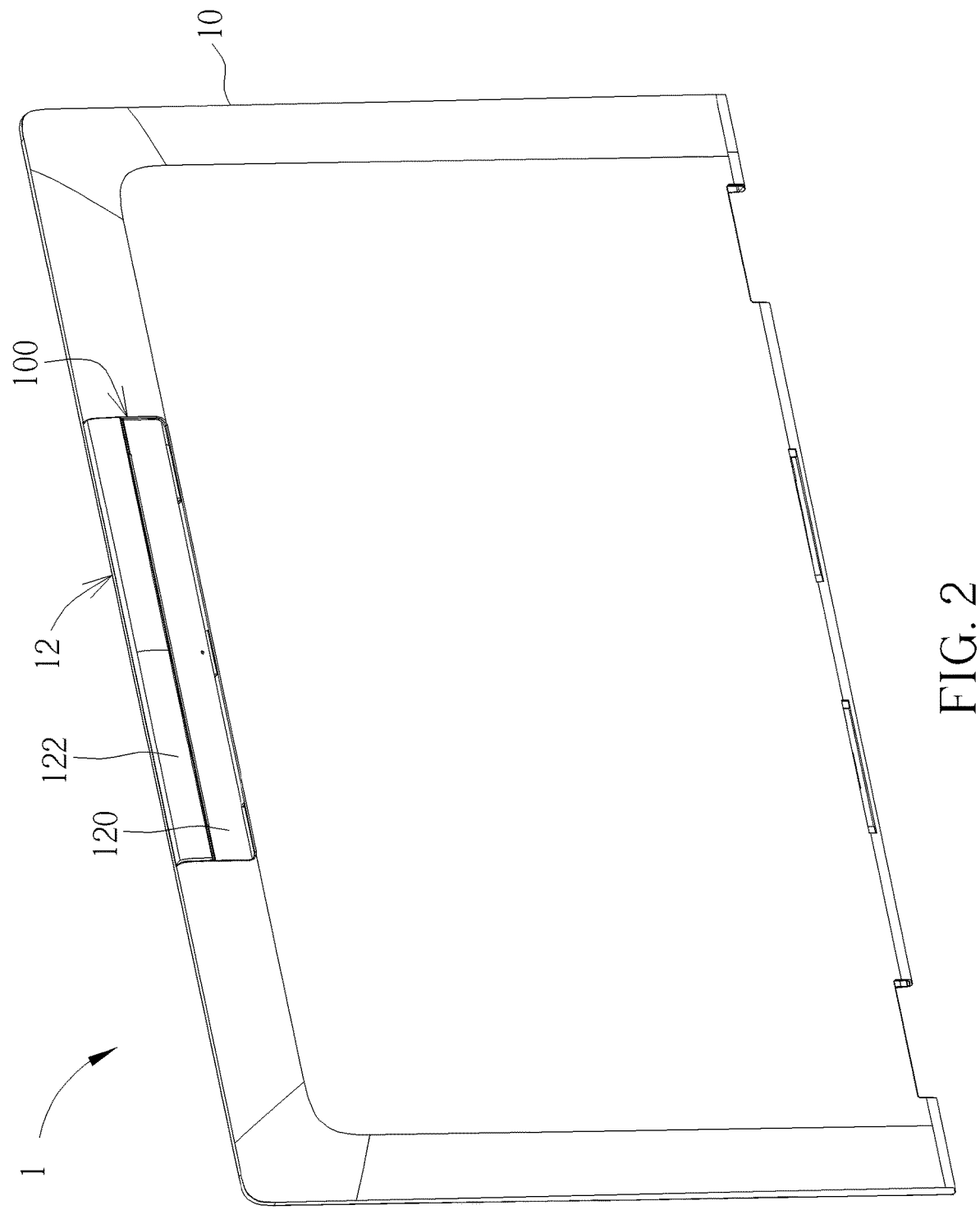
FIG. 2 is a perspective view illustrating the display device shown in FIG. 1 from another viewing angle.
Figure 3:
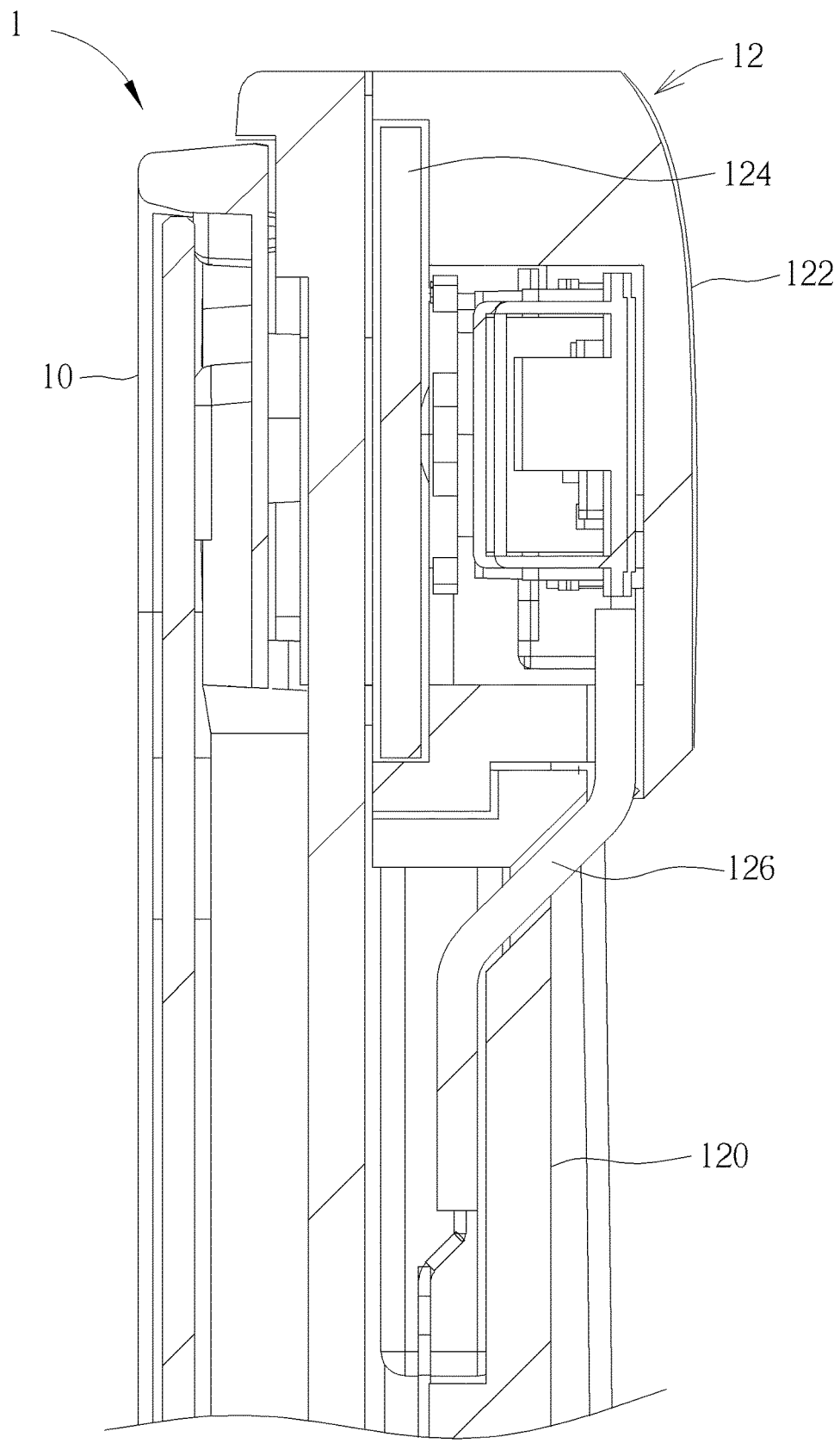
FIG. 3 is a partial sectional view illustrating the display device shown in FIG. 1.
Figure 4:
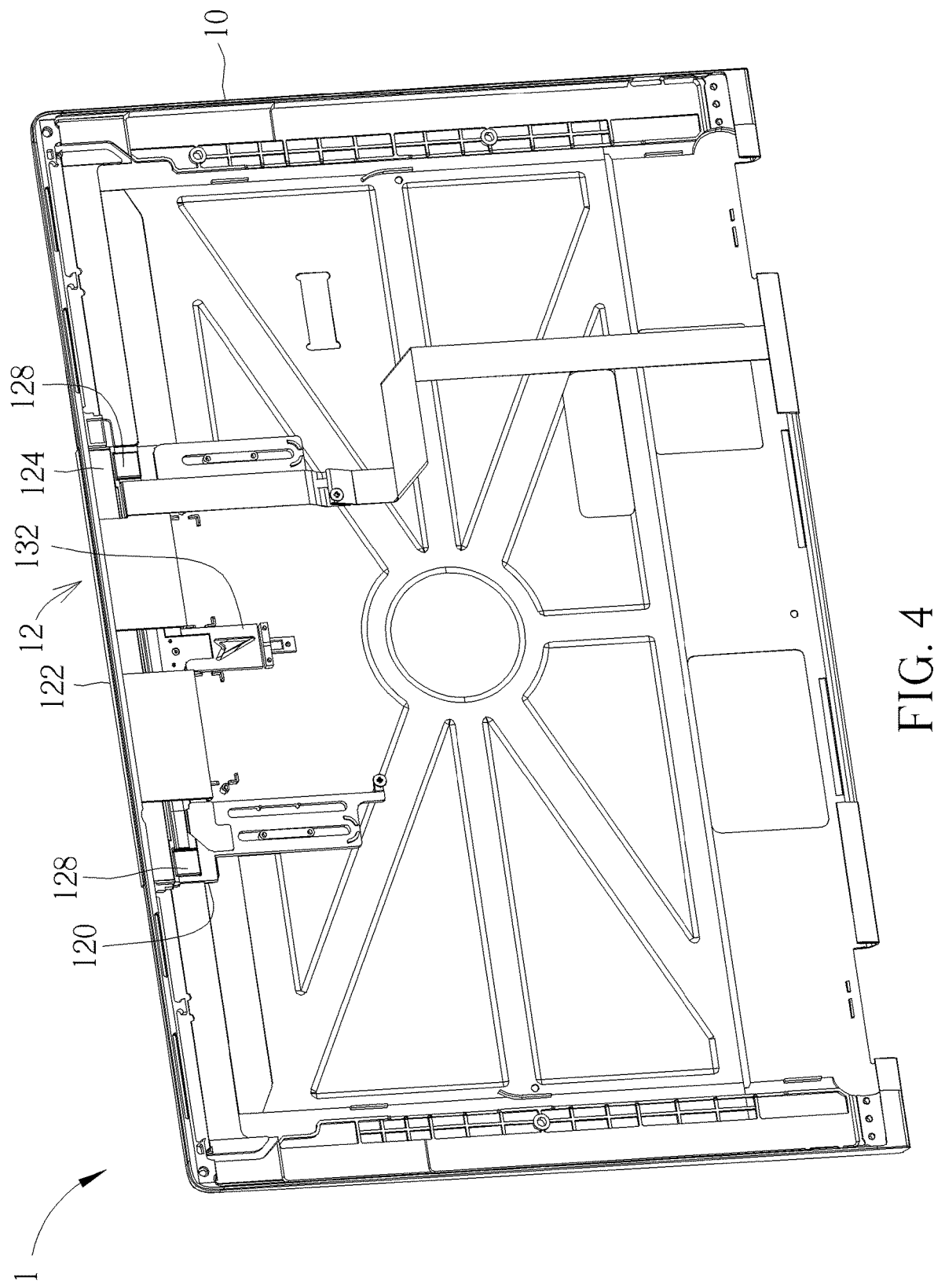
FIG. 4 is an inside view illustrating the display device shown in FIG. 1.
Figure 5:
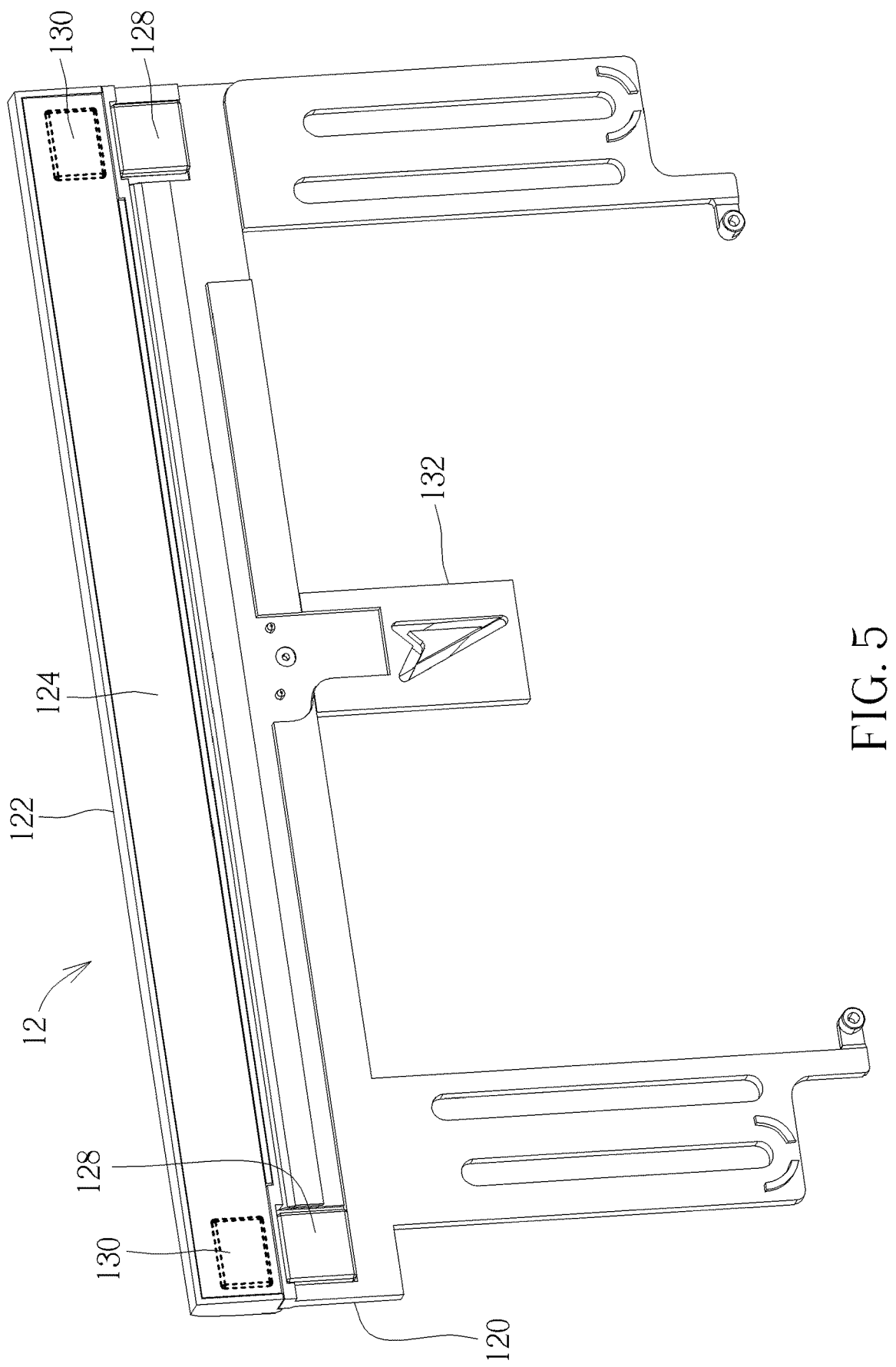
FIG. 5 is a perspective view illustrating a camera module shown in FIG. 4.
Figure 6:
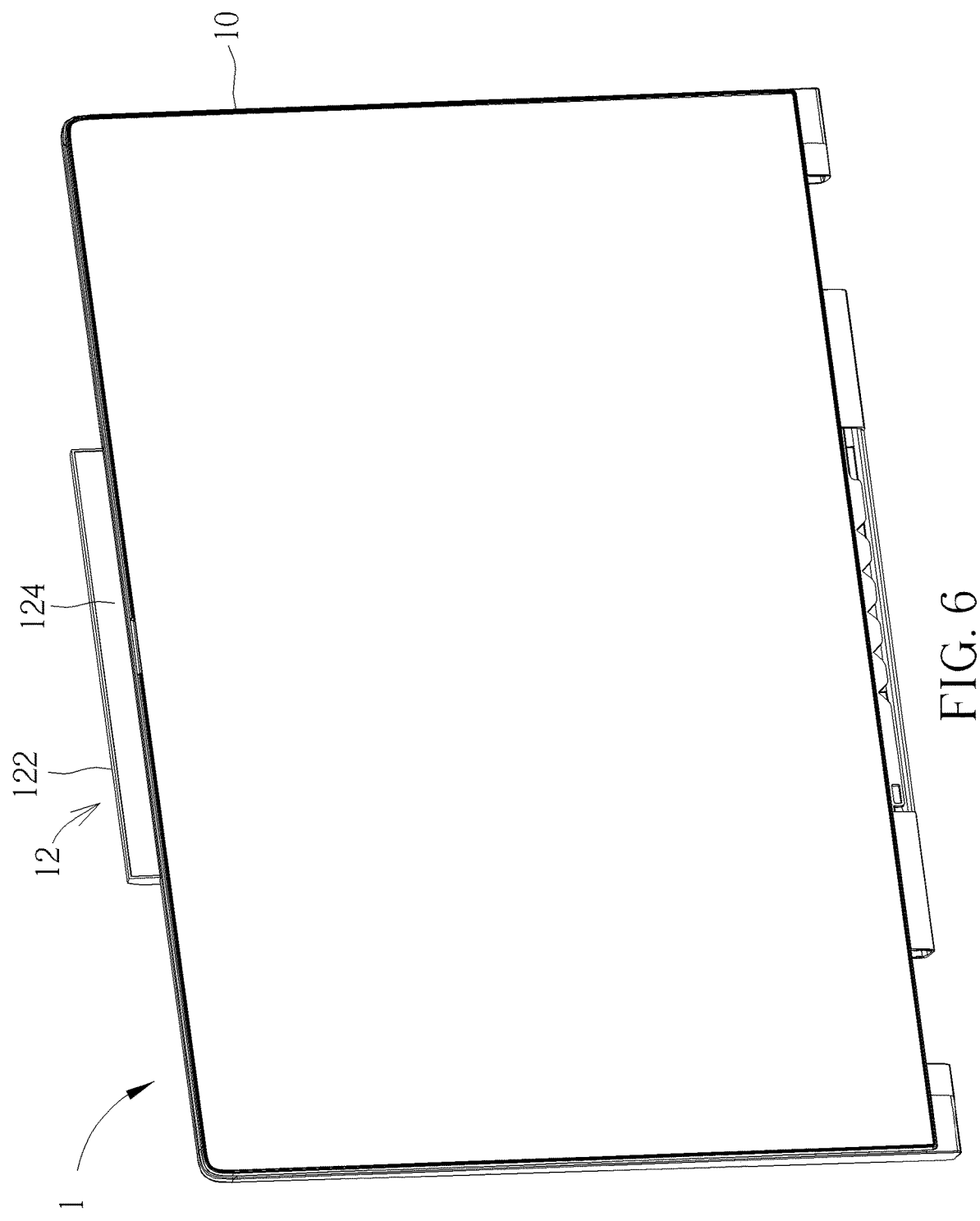
FIG. 6 is a perspective view illustrating a camera unit exposed from a display module.
Figure 7:
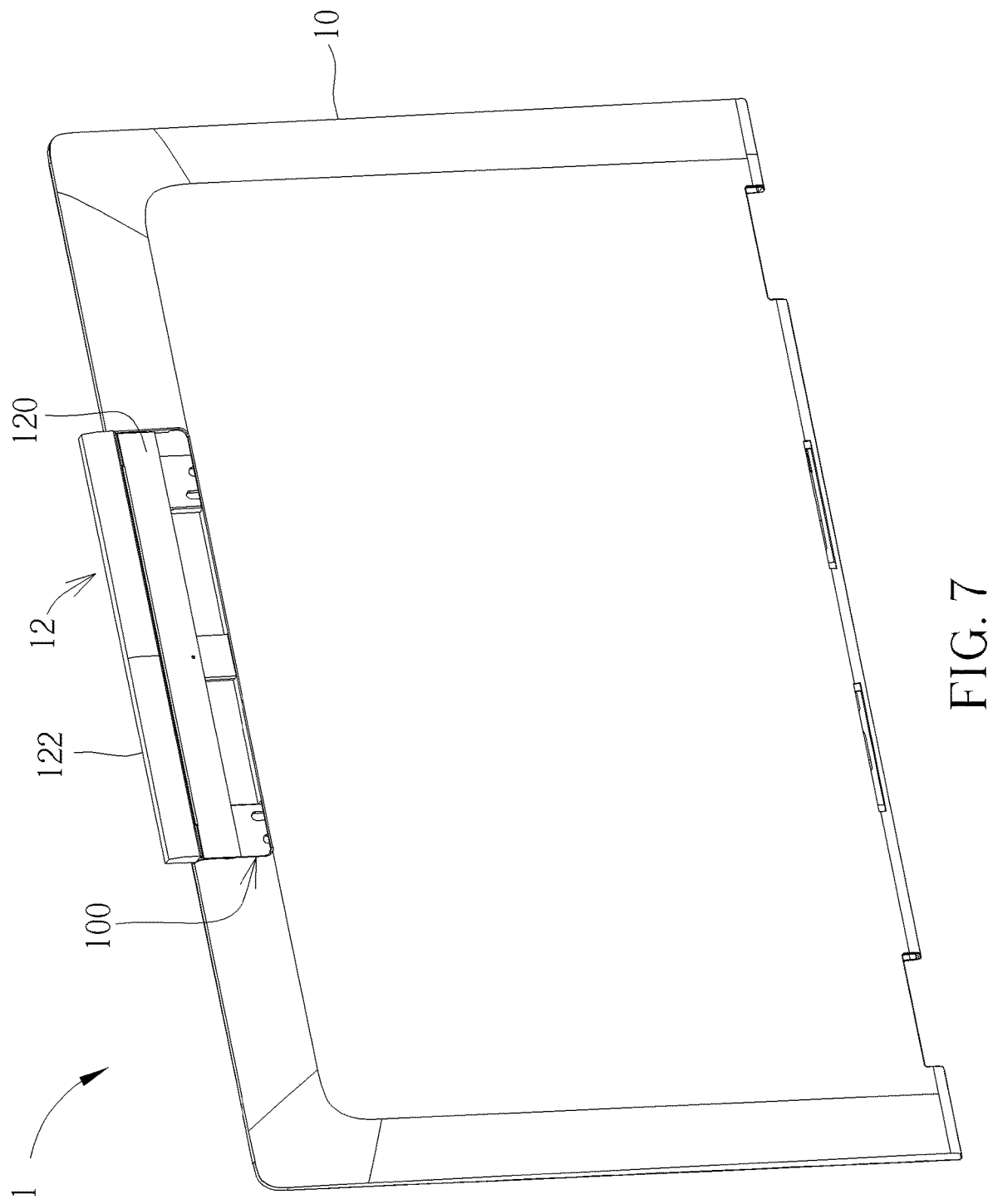
FIG. 7 is a perspective view illustrating the display device shown in FIG. 6 from another viewing angle.
Figure 8:
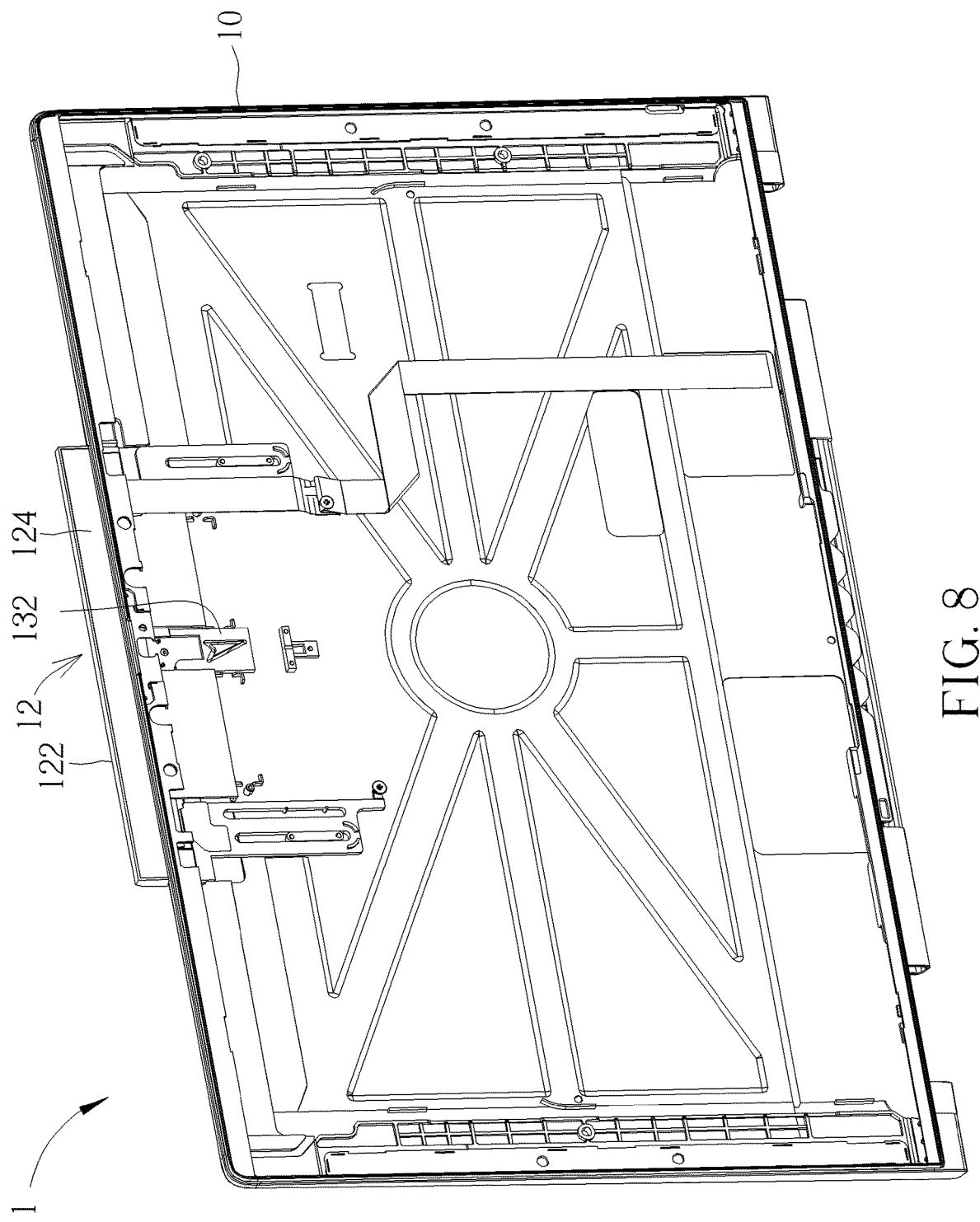
FIG. 8 is an inside view illustrating the display device shown in FIG. 8.
Figure 9:
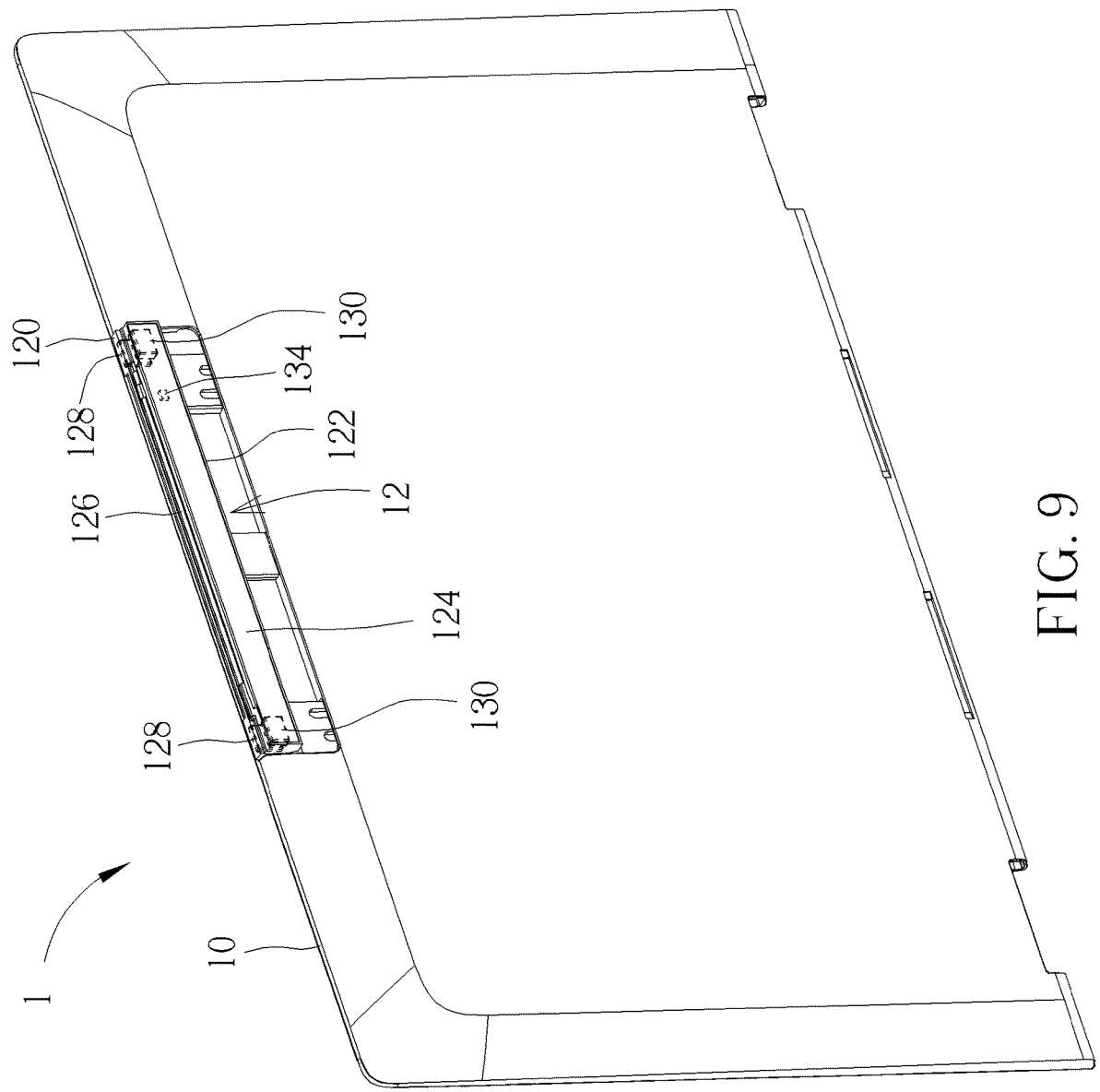
FIG. 9 is a partial perspective view illustrating a second housing shown in FIG. 7 after rotating in relative to a first housing.

Referring to FIGS. 1 to 9, FIG. 1 is a perspective view illustrating a display device 1 according to an embodiment of the invention, FIG. 2 is a perspective view illustrating the display device 1 shown in FIG. 1 from another viewing angle, FIG. 3 is a partial sectional view illustrating the display device 1 shown in FIG. 1 along line X-X, FIG. 4 is an inside view illustrating the display device 1 shown in FIG. 1, FIG. 5 is a perspective view illustrating a camera module 12 shown in FIG. 4, FIG. 6 is a perspective view illustrating a camera unit 124 exposed from a display module 10, FIG. 7 is a perspective view illustrating the display device 1 shown in FIG. 6 from another viewing angle, FIG. 8 is an inside view illustrating the display device 1 shown in FIG. 8, and FIG. 9 is a partial perspective view illustrating a second housing 122 shown in FIG. 7 after rotating in relative to a first housing 120.

As shown in FIGS. 1 to 3, a display device 1 comprises a display module 10 and a camera module 12. The display device 1 may be a display device of a notebook computer and the display module 10 may be a liquid crystal display module, but the invention is not so limited. The camera module 12 comprises a first housing 120, a second housing 122, a camera unit 124 and a flexible connecting member 126. The first housing 120 is movably disposed on the display module 10, the second housing 122 is separably connected to the first housing 120, and the camera unit 124 is disposed on the second housing 122. In this embodiment, a back of the display module 10 has an accommodating recess 100 and the camera module 12 is movably disposed in the accommodating recess 100, as shown in FIG. 2. The camera unit 124 may be a charge-coupled device (CCD) camera, a complementary metal oxide semiconductor (CMOS) camera, or other cameras. Furthermore, the flexible connecting member 126 connects the first housing 120 and the second housing 122, such that the second housing 122 is separably connected to the first housing 120. The flexible connecting member 126 may be, but is not limited to, leather.

As shown in FIG. 5, the camera module 12 may further comprise a first magnetic member 128 and a second magnetic member 130, wherein the first magnetic member 128 is disposed on the first housing 120 and the second magnetic member 130 is disposed on the second housing 122. In this embodiment, there are two first magnetic members 128 disposed on the first housing 120 and there are two second magnetic members 130 disposed on the second housing 122. The number of the first magnetic members 128 and the second magnetic members 130 may be determined according to practical applications, so the invention is not limited to the embodiment shown in the figure. The first magnetic member 128 and the second magnetic member 130 are able to magnetically attract each other to fix the second housing 122 on the first housing 120. One of the first magnetic member 128 and the second magnetic member 130 may be a magnet, and the other one of the first magnetic member 128 and the second magnetic member 130 may be a magnet or a magnetic induction material (e.g. iron or other metals) according to practical applications.

As shown in FIG. 4, the camera module 12 may further comprise a retaining mechanism 132 connected to the first housing 120. In this embodiment, the retaining mechanism 132 may be, but is not limited to, a push-push mechanism. When the camera module 12 is located at a position shown in FIG. 4, the retaining mechanism 132 retains the first housing 120 immovable, such that the camera unit 124 is hidden in the display module 10. In other words, when the camera unit 124 is hidden in the display module 10, the retaining mechanism 132 retains the first housing 120 immovable.

In this embodiment, the second housing 122 is able to move with the first housing 120 in relative to the display module 10, such that the camera unit 124 is exposed from the display module 10 or hidden in the display module 10. When a user wants to use the camera module 12, the user may press the second housing 122. When the second housing 122 is pressed, the retaining mechanism 132 releases the first housing 120, such that the second housing 122 moves with the first housing 120 upward to expose the camera unit 124 from the display module 10, as shown in FIGS. 6 to 8. When the user does not need to use the camera module 12, the user may press the second housing 122, such that the second housing 122 moves with the first housing 120 downward to hide the camera unit 124 in the display module 10, as shown in FIGS. 1 to 4. Accordingly, the privacy protection function can be achieved without adding an additional privacy protection structure.

In this embodiment, the user may further separate the second housing 122 from the first housing 120 and then rotate the second housing 122 to adjust an orientation of the camera unit 124. For further explanation, when the user wants to rotate the camera unit 124 to a direction opposite the display module 10, the user may pull the second housing 122 upward first to separate the second housing 122 from the first housing 120. Then, the user rotates the second housing 122 in relative to the first housing 120 to a position shown in FIG. 9, so as to rotate the camera unit 124 to the direction opposite the display module 10. When the second housing 122 rotates in relative to the first housing 120, the flexible connecting member 126 is bent as the second housing 122 rotates. After the second housing 122 rotates to the position shown in FIG. 9, the first magnetic member 128 and the second magnetic member 130 are still aligned with each other to magnetically attract each other, so as to fix the second housing 122 on the first housing 120. Similarly, when the user wants to rotate the camera unit 124 to a direction identical to the display module 10, the user may separate the second housing 122 from the first housing 120 first and then rotate the second housing 122 in relative to the first housing 120 to the position shown in FIGS. 6 and 7. Thus, when the second housing 122 is separated from the first housing 120, the second housing 122 is able to rotate in relative to the first housing 120, so as to adjust an orientation of the camera unit 124. Accordingly, the camera unit 124 may be used to capture images for the front or rear side of the display device 1, so as to increase the flexibility of the camera module 12 in use.

As shown in FIG. 9, the camera module 12 may further comprise a sensor 134 disposed in the second housing 122. The sensor 134 is configured to sense a current angle of the second housing 122. In practical applications, the sensor 134 may be electrically connected to a processor (not shown) by circuit layout. The processor may control an image captured by the camera unit 124 to be oriented in an upright direction according to the current angle sensed by the sensor 134. For further explanation, when the user rotates the camera unit 124 from a position shown in FIG. 6 to another position shown in FIG. 9, the processor may control an image captured by the camera unit 124 to rotate 180 degrees according to the current angle sensed by the sensor 134; and when the user rotates the camera unit 124 from the position shown in FIG. 9 to the position shown in FIG. 6, the processor may also control the image captured by the camera unit 124 to rotate 180 degrees according to the current angle sensed by the sensor 134. Accordingly, as shown in FIG. 9, when the user rotates the camera unit 124 to a direction opposite to the display module 10, the display module 10 still displays an upright frame. In this embodiment, the sensor 134 may be a G sensor, a Hall sensor, or other angle sensors.

As mentioned in the above, the invention disposes the camera module on the display module in a movable manner to prevent the camera module from occupying a space on a top side of a bezel of the display device. Accordingly, the top side of the bezel of the display device can be reduced to increase the screen-to-body ratio (STBR). Furthermore, when a user does not need to use the camera module, the camera unit may be hidden in the display module to achieve the privacy protection function without adding an additional privacy protection structure. Moreover, the user may separate the second housing from the first housing and then rotate the second housing in relative to the first housing, so as to orientate the camera unit toward a rear side of the display device. Accordingly, the camera unit may be used to capture images for the front or rear side of the display device, so as to increase the flexibility of the camera module in use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display device comprising:
 a display module; and
 a camera module comprising a first housing, a second housing, a camera unit, a first magnetic member and a second magnetic member, the first housing being movably disposed on the display module, the second housing being separably connected to the first housing, the camera unit being disposed on the second housing, the first magnetic member being disposed on the first housing, the second magnetic member being disposed on the second housing, the first magnetic member and the second magnetic member magnetically attracting each other to fix the second housing on the first housing;

wherein the second housing is able to move with the first housing in relative to the display module, such that the camera unit is exposed from the display module or hidden in the display module; when the second housing is separated from the first housing, the second housing is able to rotate in relative to the first housing, so as to adjust an orientation of the camera unit.

2. The display device of claim 1, wherein the camera module further comprises a flexible connecting member, the flexible connecting member connects the first housing and the second housing, and the flexible connecting member is bent as the second housing rotates.

3. The display device of claim 2, wherein the flexible connecting member is leather.

4. The display device of claim 1, wherein the camera module further comprises a retaining mechanism connected to the first housing; when the camera unit is hidden in the display module, the retaining mechanism retains the first housing immovable; when the second housing is pressed, the retaining mechanism releases the first housing, such that the second housing moves with the first housing to expose the camera unit from the display module.

5. The display device of claim 4, wherein the retaining mechanism is a push-push mechanism.

6. The display device of claim 1, wherein the camera module further comprises a sensor disposed in the second housing and the sensor is configured to sense a current angle of the second housing.

7. The display device of claim 1, wherein a back of the display module has an accommodating recess and the camera module is movably disposed in the accommodating recess.

* * * * *